DODGE & WALKER.
Wheel-Plow.
No. 58,788.  Patented Oct. 16, 1866.
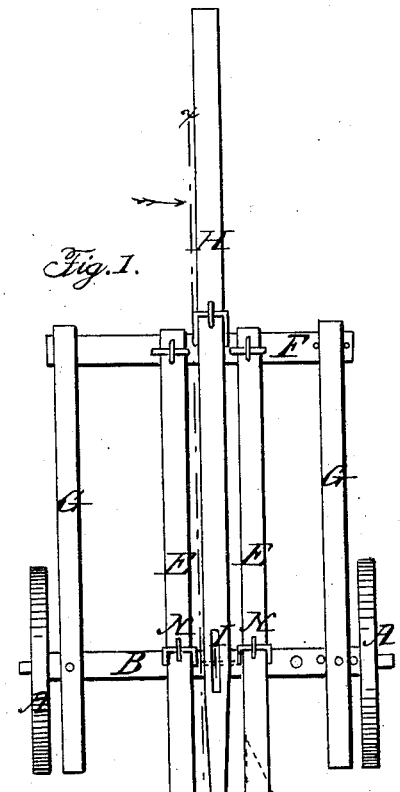
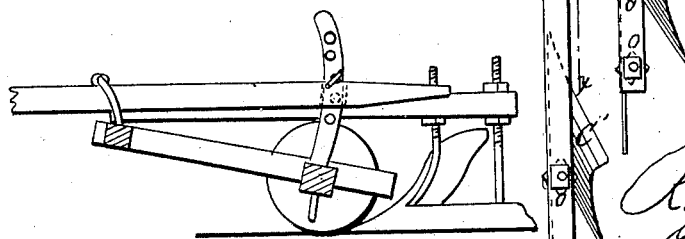

UNITED STATES PATENT OFFICE.

R. L. DODGE AND E. M. WALKER, OF GALLATIN, MISSOURI.

IMPROVEMENT IN GANG AND SUBSOIL PLOWS.

Specification forming part of Letters Patent No. 58,788, dated October 16, 1866.

*To all whom it may concern:*

Be it known that we, ROBERT L. DODGE and E. M. WALKER, of Gallatin, in the county of Daviess and State of Missouri, have invented a new and Improved Gang and Subsoil Plow; and we do hereby declare that the following is a full, clear, and exact description thereof, which will enable others skilled in the art to make and use the same, reference being had to the accompanying drawings, forming part of this specification.

The nature of our invention consists in constructing a gang of plows and arranging them in beams and attaching them to a frame in such a manner that they may be either used for surface-plows or for subsoiling. The said plows are attached to beams, which are attached to a frame that is mounted on wheels, one of which runs in the furrow, being larger than the other brings the axle on a level. This gang of plows is constructed in such a manner as to make it one of the most valuable and desirable implements of the farm.

To enable others skilled in the art to make and use our invention, we will proceed to describe its construction and operation.

Figure 1 represents a top-plan view of our improved gang and subsoil plow. Fig. 2 is a transverse vertical section, taken in line *x x*, Fig. 1.

Letters of like name and kind refer to like parts in the figures.

A A' represent two wheels of common construction. That of A' being of larger diameter runs in the furrow, so as to bring the axle B and the plow C C' on a level with the ground.

E E are the beams to which the plows are attached. The forward ends of the beams are attached by a joint to the cross-piece F of the hounds of bars G G. These bars G G are secured to the axle B.

H is the tongue, that is connected by a joint to the front cross-piece, F, and extends back and receives a standard, I, which is provided with holes, so that the forward end of the tongue may be elevated and lowered, as may be desired.

The operation will be readily understood. For surface-plowing it is adjusted to accommodate that kind of work by means of the staples N N, which may be elevated and lowered as may be desired. The rear end of the pole may also be lowered and raised as the nature of the work may require, and secured in its place by means of a pin through the standard I. The plows may also be elevated or lowered by means of nuts O O O O, so that the plows can be used for subsoiling.

Now, it will be seen that the plow C' can be used as a surface-plow while at the next round the plow C can follow in the furrow made by the plow C', and subsoil, and so on, the plow C following, at each successive round, in the furrow made by the plow C', which makes it one of the most convenient gang and subsoil plows now in use.

Having thus described our invention, what we claim as new, and desire to secure by Letters Patent of the United States, is—

1. The construction and arrangement of the pole H, in connection with the standard I and axle B, so that it may be elevated and lowered, substantially as described.

2. The pole H, when hinged to the cross-bar of the frame so as to form a lever to raise the plows, in combination with the plow-beams E E and plow C C', when constructed for the purposes and substantially as described.

ROBERT L. DODGE.
ELIAS M. WALKER.

Witnesses:
ROBERT A. VANCE,
W. C. GILLIHAN.